(12) United States Patent
Ewald et al.

(10) Patent No.: US 11,628,626 B2
(45) Date of Patent: Apr. 18, 2023

(54) RECOATER MOVEMENT

(71) Applicant: HEWLETT-PACKARD DEVELOPMENT COMPANY, L.P., Houston, TX (US)

(72) Inventors: Brent Ewald, Vancouver, WA (US); Michael Ewe, Vancouver, WA (US); Eric Collins, Vancouver, WA (US); Wesley R. Schalk, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 854 days.

(21) Appl. No.: 16/074,974

(22) PCT Filed: Apr. 21, 2017

(86) PCT No.: PCT/US2017/028915
§ 371 (c)(1),
(2) Date: Aug. 2, 2018

(87) PCT Pub. No.: WO2018/194672
PCT Pub. Date: Oct. 25, 2018

(65) Prior Publication Data
US 2021/0197481 A1 Jul. 1, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/218* (2017.08); *B29C 64/232* (2017.08);
(Continued)

(58) Field of Classification Search
CPC ... B29C 64/393; B29C 64/232; B29C 64/236; B29C 64/218; B33Y 10/00; B33Y 30/00; B33Y 50/02
See application file for complete search history.

(56) References Cited

U.S. PATENT DOCUMENTS

| 8,021,139 B2 | 9/2011 | Kumagai et al. |
| 8,568,124 B2 | 10/2013 | Brunermer |

(Continued)

FOREIGN PATENT DOCUMENTS

| EP | 2286982 A1 | 2/2011 | |
| EP | 2286982 B1 * | 9/2013 | ............ B22F 3/1055 |

(Continued)

OTHER PUBLICATIONS

Lindley et al., "3D Printing Titanium and the Bin of Broken Dreams", Retrieved form internet—http://pencerw.com/feed/2015/3/15/3d-printing-titanium-and-the-bin-of-broken-dreams, 2015, 15 Pages.

*Primary Examiner* — Yung-Sheng M Tsui
(74) *Attorney, Agent, or Firm* — Shook, Hardy & Bacon L.L.P.

(57) ABSTRACT

Example systems relate to recoater movement. A non-transitory machine readable medium may contain instructions executable by a processor. The instructions may include instructions to change an action of a recoater in response to a determination that the recoater has reached a first location of a build area comprising build material. Instructions may further include instructions to lift the recoater in response to a determination that the recoater has reached a second location of the build area. Instructions may additionally include instructions to move the recoater over the second location at the lifted position, wherein the second location includes a build-up of the build material.

14 Claims, 6 Drawing Sheets

(51) Int. Cl.
  *B33Y 30/00*    (2015.01)
  *B33Y 50/02*    (2015.01)
  *B29C 64/232*   (2017.01)
  *B29C 64/236*   (2017.01)
  *B29C 64/218*   (2017.01)

(52) U.S. Cl.
  CPC ............ *B29C 64/236* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2015/0343533 A1* | 12/2015 | Park | B22F 3/18 425/375 |
| 2015/0367417 A1 | 12/2015 | Buller et al. | |
| 2016/0121399 A1 | 5/2016 | Buller et al. | |
| 2016/0160021 A1 | 6/2016 | Kojima et al. | |
| 2017/0120521 A1* | 5/2017 | Sakura | B22F 12/60 |

FOREIGN PATENT DOCUMENTS

| | | |
|---|---|---|
| WO | WO2011/007087 A2 | 1/2011 |
| WO | WO2011/007087 A3 | 1/2011 |
| WO | 2014138386 A1 | 9/2014 |
| WO | 2017023281 A1 | 2/2017 |

\* cited by examiner

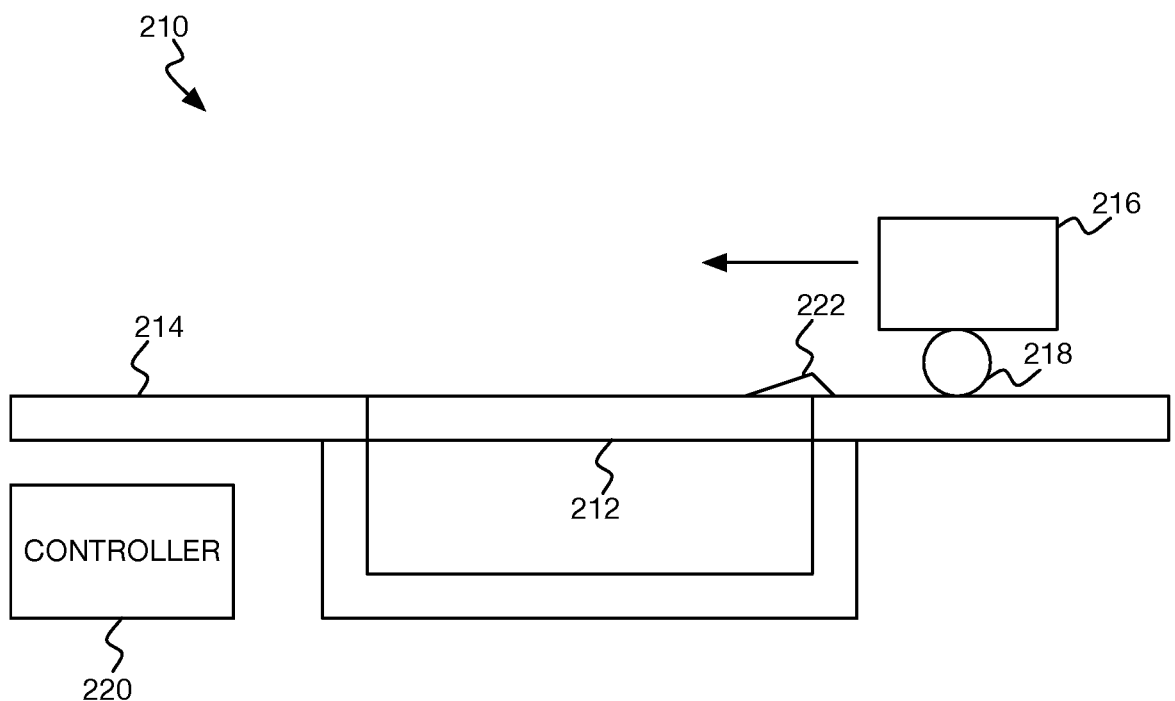

RECOATER MOVEMENT

BACKGROUND

Additive manufacturing techniques, such as three-dimensional (3D) printing, can manufacture objects through deposition of successive layers of build material onto a build surface. Build material may be deposited onto the build surface where it may then be leveled. Portions of the build material may then be selectively solidified, and the process may be repeated until the 3D object is fully manufactured.

BRIEF DESCRIPTION OF THE DRAWINGS

FIG. 2C is an example system for recoater movement according to the present disclosure.

DETAILED DESCRIPTION

Figure 1:
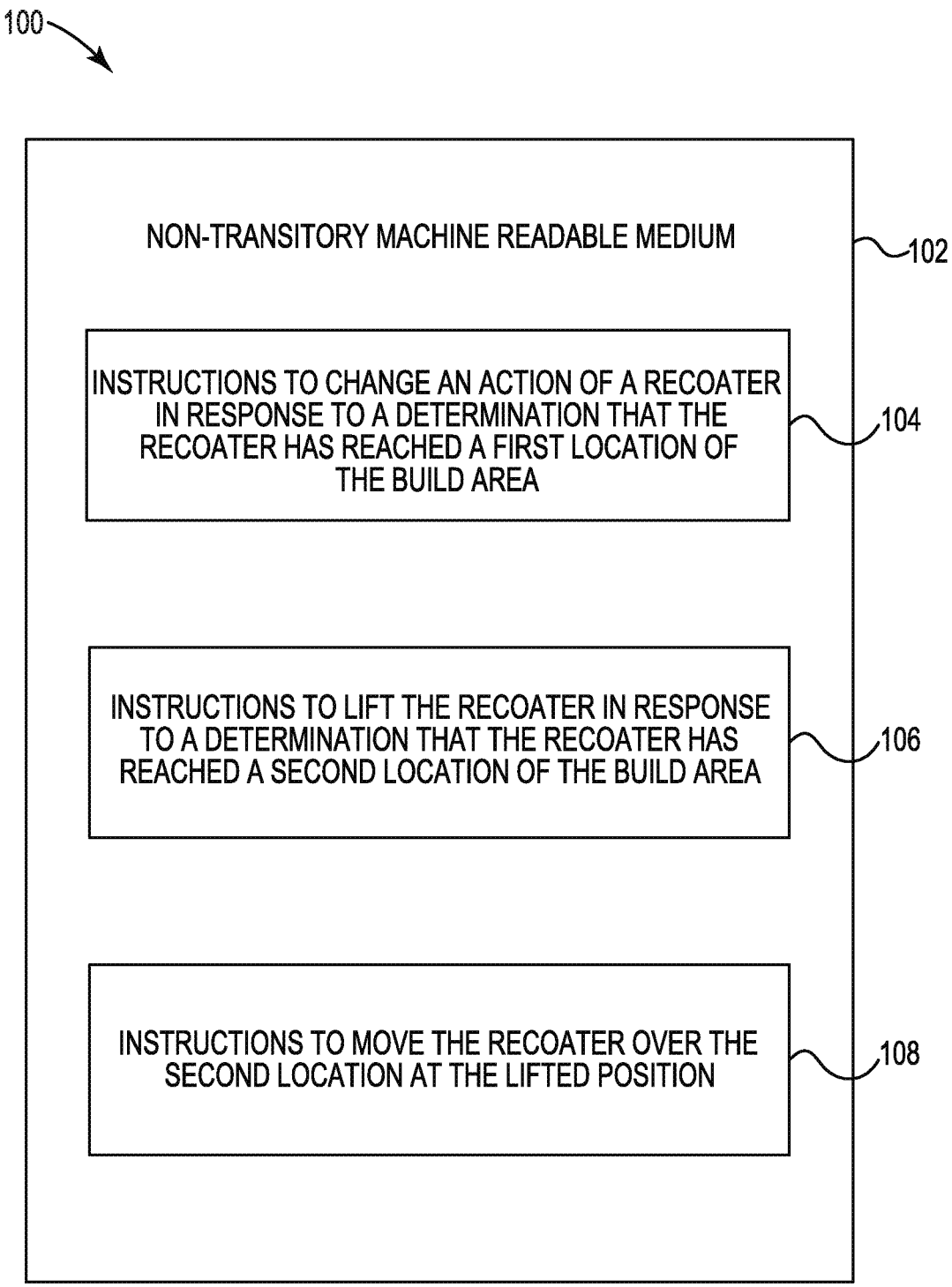
FIG. 1 is an example system for recoater movement according to the present disclosure.

Additive manufacturing techniques, such as 3D printing, may involve deposition of build material onto a build surface. As used herein, a build material refers to a material able to be deposited and selectively solidified to create a 3D object. A build material may be a thermoplastic powder, a powdered metal material, powdered plastic material, powdered resin material, or any other material suitable for use in additive manufacturing. A build surface may refer to a portion of a build platform onto which build material is deposited. The build surface may be part of a larger build area, which may include a build support area on either side of the build surface.

The build material may be deposited onto the build surface by, for example, a build material dispenser. In some examples, the build material may be dispensed by the build material dispenser over an entire area of a build surface. The build material may then be spread. In other examples, an amount of build material may be prepared on a build support area. In such examples, the amount of build material may be moved into the build area of a build surface. The build material may be spread by a recoater passing over the deposited or the prepared build material. As used herein, a recoater refers to an apparatus to spread build material. A recoater may be a roller, a wiper, a spreader, or any other apparatus suitable for spreading build material. The recoater may spread the build material to a uniform thickness. The recoater may further move excess build material off the build surface.

Once a recoater has finished a spread pass on the build surface, an excess amount of build material may be present. The excess amount of build material may be pushed into a vacuum located at an edge of the build surface, on the build support area, for disposal. However, while disposal of excess build material ensures that the build support area remains clean and free of build material, the excess build material is wasted because it may not be reintegrated into the system for reuse.

Alternatively, the excess amount of build material may be re-collected by the build material dispenser in, for example, a collection bin. In such examples, the re-collected build material may be re-integrated with other build material and may be re-dispensed by the build material dispenser. Collection of the excess build material in a collection bin may thus allow the excess build material to be reintegrated into the system through reuse. However, using a collection bin presents additional processes to be performed by the system prior to another pass of the build material dispenser. This may add time to the process of creating a 3D printed object.

Recoater movement according to the present disclosure, by contrast, may allow for immediate reintegration of an excess amount of build material into the system. In some examples, a recoater may reduce a rate of rotation upon reaching a first location of the build area. In such examples, the recoater may continue moving across the build surface to spread the build material. Upon reaching a second location on the build surface, the roller may lift off the build surface. The recoater may then move over an amount of excess build material.

Once the recoater has moved over the amount of excess build material, the roller may be lowered. The recoater may then begin a subsequent spreading pass. Additionally, the recoater may move the excess build material back into the build area, thus reintegrating it into the system. The excess build material may already be heated from its use in a prior pass. As a result, roller movement according to the present disclosure may reduce an amount of energy used to warm excess build material. Moreover, because the excess build material may already be heated, an amount of warping of the printed object caused by cool build material being dispensed onto warm build material may be reduced.

Furthermore, recoater movement according to the present disclosure may not rely on additional collection systems for reintegration of excess build material into the system. For example, a collection bin and/or vacuum system may not be used; rather, the excess build material may be immediately reintegrated into the system. Additionally, recoater movement according to the present disclosure may result in layers of the build material being able to be spread more quickly because additional processes involving collection of excess material may not be performed. As a result, printer productivity may be improved and the printed object may experience less warp.

FIG. 1 is an example system 100 for recoater movement according to the present disclosure. System 100 may include a non-transitory machine readable storage medium 102. Non-transitory machine readable storage medium 102 may be any electronic, magnetic, optical, or other physical storage device that stores executable instructions. Thus, non-transitory machine readable storage medium 102 may be, for example, Random Access Memory (RAM), an Electrically-Erasable Programmable Read-Only Memory (EEPROM), a storage drive, an optical disc, and the like. Non-transitory machine readable storage medium 102 may be disposed within system 100, as shown in FIG. 1. In this example, the executable instructions may be "installed" on the system 100. Additionally and/or alternatively, non-transitory machine readable storage medium 102 may be a portable, external or remote storage medium, for example, that allows system 100 to download the instructions from the portable/external/remote storage medium. In this situation, the executable instructions may be part of an "installation package". As described herein, non-transitory machine readable storage medium 102 may be encoded with executable instructions for a performance threshold.

Instructions 104 may include instructions to change an action of a recoater in response to a determination that the recoater has reached a first location of a build area. As used herein, an action of a recoater may include a movement of the recoater. For example, an action of a recoater may include rotation of the recoater. In some examples, changing an action of a recoater may include changing a rate of rotation of the recoater. As used herein, a rate of rotation may include a quantity of rotations per unit of time. In some examples, the build area may comprise build material. The first location of the build area may be a location of the build area that is a particular distance from the edge of the build area. Said differently, the first location of the build area may be a non-edge location of the build area. The first location may be a location on the build area having a particular distance from an approaching second location.

Prior to reaching the first location of the build area, the recoater may be rotating at a first rate of rotation in a first direction of rotation. Upon reaching the first location of the build area, instructions 104 may include instructions to determine that the recoater has reached the first location. Instructions 104 may further include instructions to reduce the rate of rotation from the first rate of rotation to a second rate of rotation. In some examples, the second rate of rotation is less than the first rate of rotation. Said differently, the recoater may complete fewer rotations per unit of time at the second rate of rotation than at the first rate of rotation. The recoater may continue rotating in the first direction of rotation at the second rate of rotation.

Reducing the rate of rotation from the first rate of rotation to the second rate of rotation may occur in response to the determination that the recoater is a particular distance away from an edge of the build area. In some examples, reducing the rate of rotation of the recoater may reduce the rate at which build material is leveled on the build area. Thus, as the recoater approaches the edge of the build area, the reduced rate of rotation of the roller may result in less excess build material being moved toward the edge of the build area. In addition, reducing the rate of rotation of the recoater prior to the recoater reaching an edge of the build material may result in a smoother transition between the directions of rotation. The transition between a first direction of rotation and a second direction of rotation is discussed further herein.

Despite experiencing a reduced rate of rotation, the recoater may remain in contact with the build area. As such, the recoater may continue to spread, move, or otherwise engage with the build material on the build area. In some examples, the recoater may continue to engage with build material throughout a remaining portion of build area, i.e., the portion of the build area not yet passed by the roller.

Changing an action of the recoater at 104 may further include changing a speed at which the recoater is traveling. In some examples, the speed at which the recoater is traveling with respect to the build area may be reduced. In some examples, the recoater may be both rotating and moving horizontally with respect to the build area at a first speed. The speed at which the recoater is traveling horizontally may be reduced in response to the determination that the recoater has reached the first location of the build area. In some examples, the speed of the recoater may be reduced in addition to the rate of rotation of the recoater being reduced.

Instructions 106 may include instructions to lift the recoater in response to a determination that the recoater has reached a second location of the build area. In some examples, the second location may be located subsequent to the first location. That is, the recoater may reach the second location of the build area after it has reached the first location of the build area. In some examples, the second location may be located at an edge of a build area. The second location may further include a build-up of build material. Instructions 106 may include instructions to lift the recoater such that the roller disengages with the build area and thus disengages with the build material.

The second location may be located at an edge of the build area and may include a build-up of build material. In some examples, the build-up of build material may have a height. Instructions 106 may include instructions to determine the height of the build-up of build material. Instructions 106 may then include instructions to lift the roller to a distance that is greater than the height of the build-up of build material. Said differently, instructions 106 may include instructions to lift the recoater a distance that is greater than the height of the build-up of build material.

Instructions 108 may include instructions to move the recoater over the second location at the lifted position. As previously discussed, the second location may include a build-up of build material. Thus, instructions 108 may include instructions to move the roller over the build-up of build material at the second location. In some examples, the recoater was lifted at 106 to a distance greater than the height of the build-up of build material. As such, moving the recoater over the second location at the lifted position at 108 may allow the recoater to move over the build-up of build material without disturbing the build material. Said differently, the recoater may pass over the build-up of build material without moving the build material.

System 100 may further include instructions to change a direction of rotation of the recoater. In some examples, the direction of rotation of the recoater may be changed subsequent to the roller passing over the second location. For example, the recoater may be rotating in a first direction, such as clockwise, during movement over the build area and while the recoater was being lifted and passed over the second location. Once the recoater has passed the second location, the instructions may cause the recoater to change from the first direction of rotation to a second direction of rotation, such as counterclockwise. Examples are not so limited, however, and any direction of rotation may be used.

System 100 may further include instructions to lower the recoater. In some examples, lowering the recoater may include reversing the process to lift the recoater. In some examples, lowering the recoater may include lowering the recoater to its pre-lift height.

Once the recoater has been lowered, system 100 may include instructions to pass the recoater over the second location in the lowered position. In some examples, the recoater may be passed over the second location in the opposite direction. That is, if the recoater traversed the second location from left to right in its lifted position, the recoater may pass over the second location from right to left. In some examples, this may cause the recoater to level the build-up of build material. Said differently, passing the recoater over the second location in the opposite direction may cause the build-up of build material to be moved back into the build area, where it may be leveled.

As described previously, the recoater may be rotating in a second direction of rotation. The second direction of rotation may allow the recoater to "push" the build-up of material over the build area. For example, the recoater may be rotating in a direction according to its direction of movement across the second location, such that build material will not be caught under the recoater and remain at the second location. For example, the recoater may initially be moving from left to right, and have a counterclockwise direction of rotation. When the recoater moves over the second location, the direction of rotation may change to clockwise. As a result, when the recoater moves over the second location from right to left, the clockwise rotation of the recoater may push the build-up of build material back over the build area. By contrast, if the recoater was moving from right to left but continued to rotate in a counterclockwise direction, the build-up of build material may be pushed away from the build area. This may result in an amount of the build-up of build material not being reintegrated into the system; instead, some of the build-up of build material may be pushed back into the vacuum located on the build support area. Matching a direction of travel with a direction of rotation may help ensure that a maximum amount of build-up of build material is able to be reintegrated into the system by minimizing the amount of build material pushed away from the build area by opposing directional forces caused by a mismatch in direction of travel and direction of rotation. In addition, matching a direction of travel with a direction of rotation may help keep the build-up of build material in front of the recoater as the roller travels over the build area. This may help reduce an amount of build-up of build material spread onto the build support area. Moreover, matching a direction of travel with a direction of rotation may help control compaction of the build surface, which may reduce a risk of damage to a molten printed object. Examples are not so limited, however, and any combination of direction of travel and direction of rotation may be used.

Figure 2A:
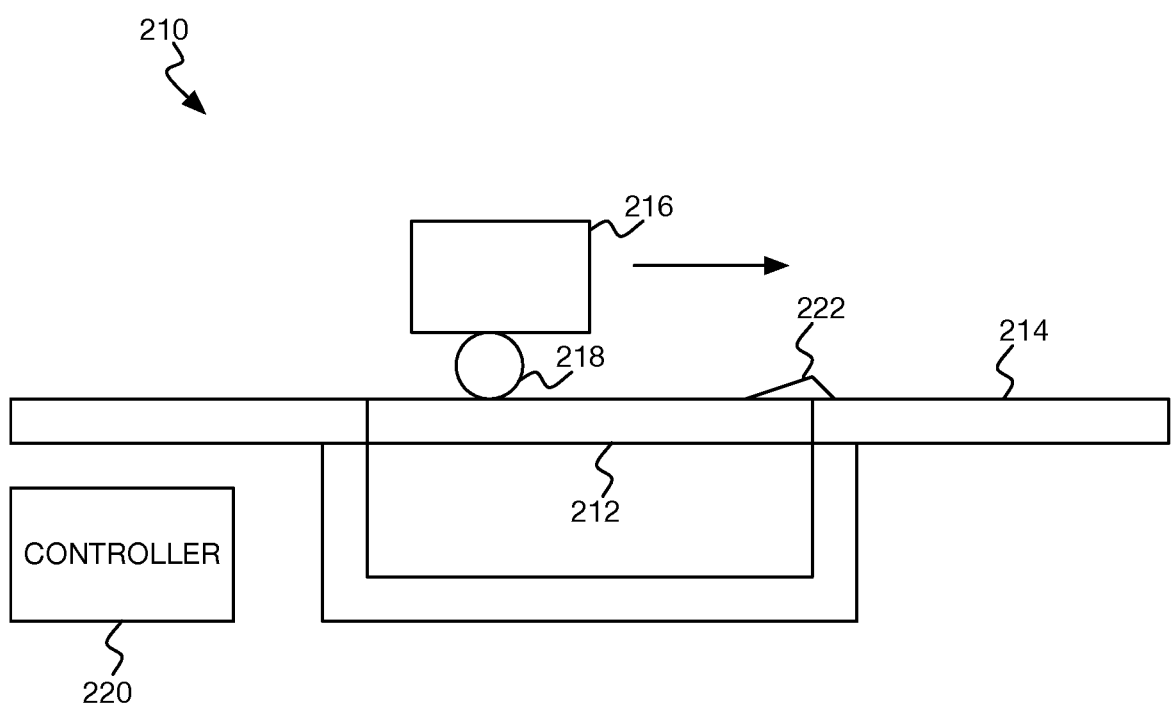
FIG. 2A is an example system for recoater movement according to the present disclosure.

FIG. 2A is an example system 210 for recoater movement according to the present disclosure. System 210 may include a build area 212. Build area 212 may include or comprise build material. System 210 may further include a build support area 214. Build support area 214 may be located on either side of build area 212, as shown in FIG. 2A.

System 210 may further include a carriage device 216. As used herein, a carriage device refers to a device that moves along or across an area. In some examples, carriage device 216 may move across build area 212. Carriage device 216 may include a recoater 218. As discussed previously, recoater 218 may serve to spread and/or level the build material on the build area 212.

System 210 may include a controller 220. As used herein, a controller refers to an apparatus used to provide instructions to a portion of a system, such as system 210. Controller 220 may execute instructions corresponding to functions for the carriage device 216 and/or the recoater 218. In some examples, controller 220 may include a processing resource and/or a memory resource. Further discussion of controller 220 will be provided with respect to FIG. 3.

As shown in FIG. 2A, carriage device 216 and recoater 218 are moving across build area 212 in a first direction, as indicated by the arrow. A build-up of build material 222 is located at the edge of build area 212, near build support area 214. The build-up of build material 222 may be the result of an excess amount of build material being dispensed onto the build area 212 for spreading by the recoater 218. Because the recoater 218 may serve to level build material on the build area 212 to a uniform thickness, excess build material may collect at an edge of the build area 212 as a build-up of build material, such as build-up of build material 222. In some examples, the build-up of build material 222 may extend beyond the build area 212 onto the build support area 214. As discussed with respect to FIG. 1, the rate of rotation of recoater 218 may be reduced in response to a determination that recoater 218 has reached a first location of the build area.

Figure 2B:
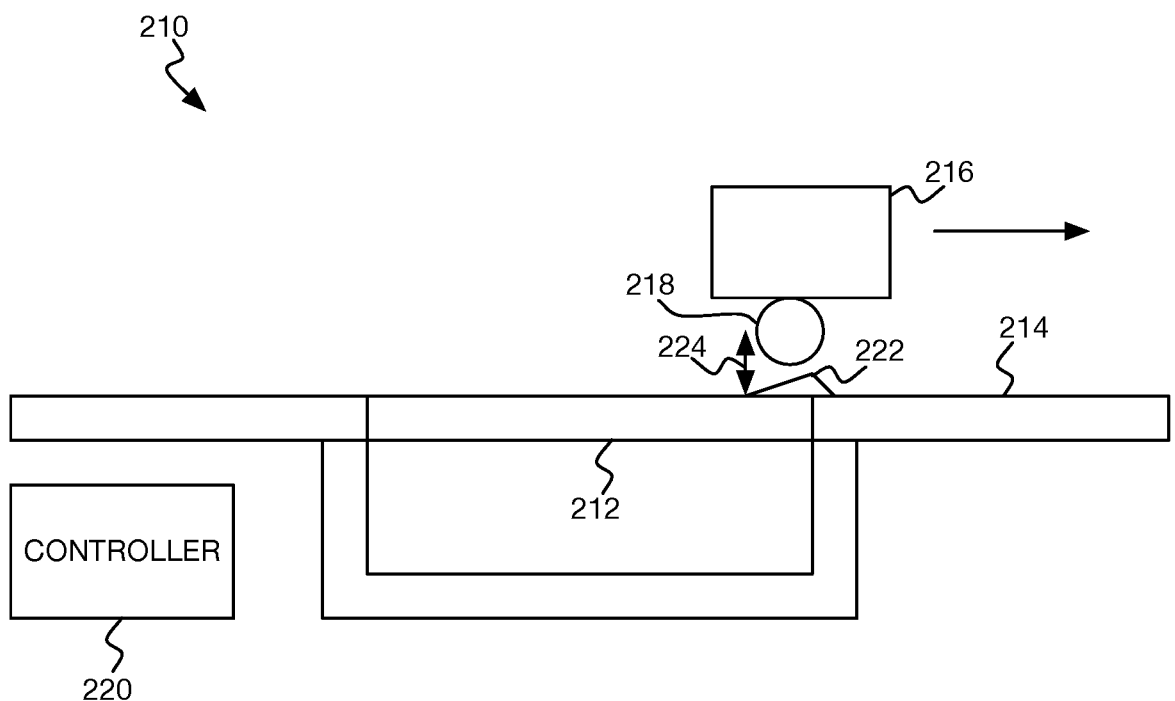
FIG. 2B is an example system for recoater movement according to the present disclosure.

FIG. 2B is an example system 210 for recoater movement according to the present disclosure. Recoater 218 may be lifted a distance 224 above the build area 212. As discussed previously, recoater 218 may be lifted in response to a determination that recoater 218 has reached a second location of the build area 212. In some examples, the second location of build area 212 may be a location containing a build-up of build material 222. As shown in FIG. 2B and discussed previously with respect to FIG. 1, distance 224 may be greater than a height of the build-up of build material 222. Said differently, recoater 218 may be lifted a distance 224 that allows recoater 218 to pass over the build-up of build material 222. In some examples, recoater 218 may be lifted a distance 224 but carriage 216 may not be lifted.

As shown in FIG. 2B, carriage 216 and recoater 218 may continue moving in the first direction of travel, as indicated by the arrow. This may allow carriage 216 and recoater 218 to move over the build-up of build material 222. As described further herein, moving the carriage 216 and the recoater 218 over the build-up of build material 222 may put the carriage 216 and the recoater 218 in a position to move the build-up of build material back over the build area 212. That is, carriage 216 and recoater 218 may continue moving in the first direction of travel over the build-up of build material 222 until the carriage 216 and recoater 218 have cleared the build-up of build material 222. This may allow the carriage 216 and the recoater 218 to reintegrate the build-up of build material 222 back into the system.

FIG. 2C is an example system 210 for recoater movement according to the present disclosure. Carriage 216 and recoater 218 may now be moving in a second direction, as indicated by the arrow. The second direction may be opposite the first direction, shown in FIGS. 2A and 2B. Additionally, recoater 218 may be lowered from the lifted position shown in FIG. 2B. This may allow recoater 218 to engage with the build-up of build material 222 and move the build-up of build material over the build area 212. By moving in a second direction that may be opposite the first direction, carriage 216 and recoater 218 are able to begin a second pass of build area 212 in a direction opposite the first pass. Additionally, by moving in a second direction in the lowered position, recoater 218 may engage with the build-up of build material 222 to push the build material back over the build area 212 and thus may reintegrate the build material in the build-up of build material 222 with the system. In some examples, the build area 212 may have sufficient build material on it such that build area 212 is approximately level with build support area 214.

Figure 3:
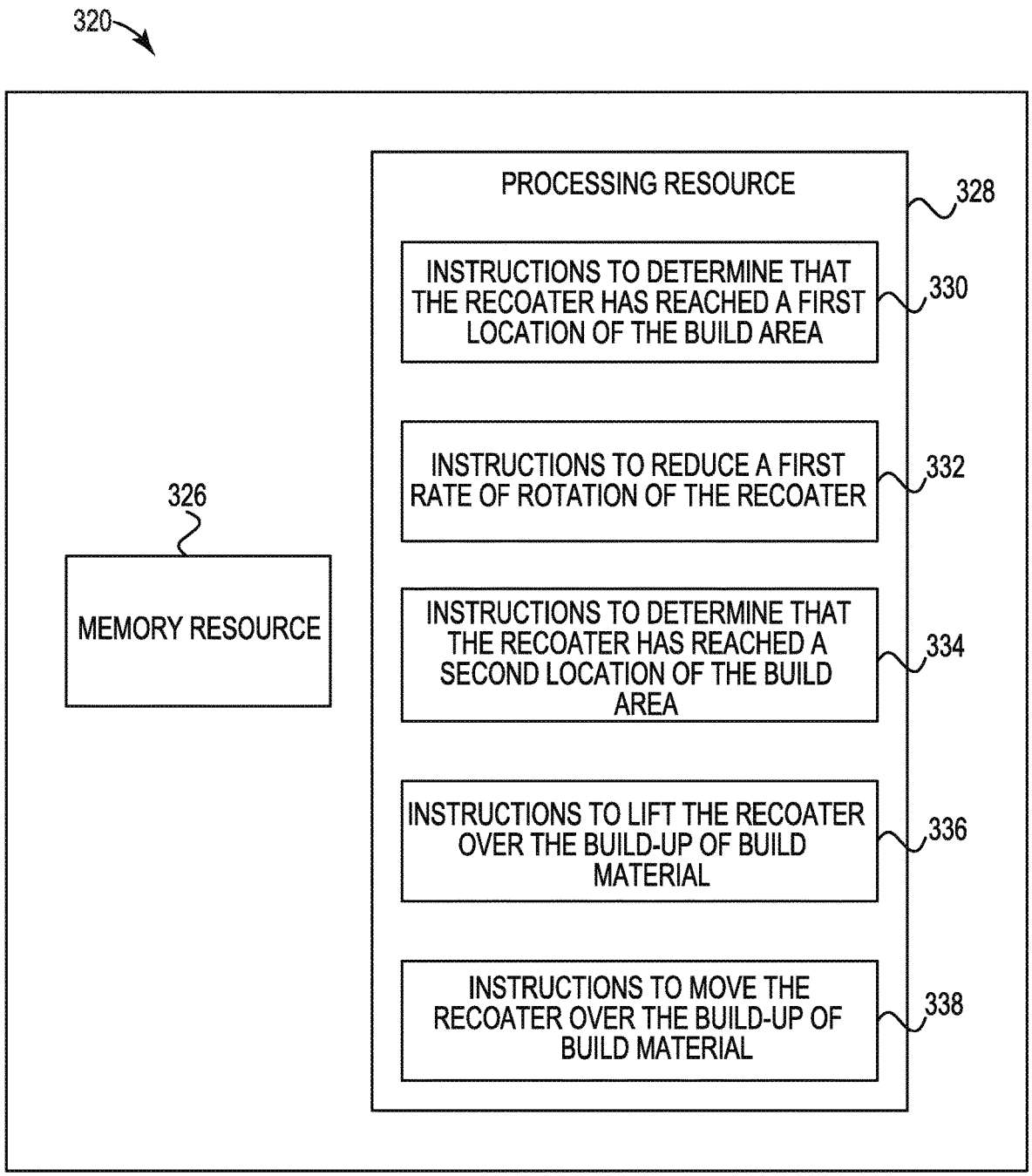
FIG. 3 is an example of a controller for recoater movement according to the present disclosure.

FIG. 3 is an example of a controller 320 for recoater movement according to the present disclosure. In some examples, controller 320 may be utilized in a system for recoater movement. For example, the controller 320 may be utilized in system 210, as shown in FIG. 2. As shown in FIG. 3, controller 320 may include a processing resource 326. Controller 320 may further include a memory resource 328, on which instructions may be stored, such as instructions 330, 332, 334, 336, and 338. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 326 may be a central processing unit (CPU), a semiconductor based microprocessor, and/or other hardware devices suitable for retrieval and execution of instructions stored in memory resource 328. Processing resource 326 may fetch, decode, and execute instructions 330, 332, 334, 336, 338, or a combination thereof. As an alternative or in addition to retrieving and executing instructions, processing resource 326 may include at least one electronic circuit that includes electronic components for performing the functionality of instructions 330, 332, 334, 336, 338, or a combination thereof.

Instructions 330, when executed by processing resource 326, may cause the processing resource to determine that a recoater has reached a first location of a build area. In some examples, instructions 330 may include instructions to determine that the recoater has reached the first location of the build area when moving in a first direction. Said differently, instructions 330 may include instructions to determine that the recoater has reached the first location of the build area with respect to the direction in which the recoater is moving.

Instructions 332, when executed by processing resource 326, may cause the processing resource to reduce a first rate of rotation of the recoater. In some examples, instructions 332 may cause the processing resource to reduce the first rate of rotation of the recoater in response to the determination that the recoater has reached a first location of a build area. Instructions 332 may include instructions to reduce the first rate of rotation by a threshold amount. The threshold amount may correspond to a set rate of rotation by which the first rate of rotation is to be reduced. For example, the recoater may be rotating at a first rate of 360 rotations per minute. Instructions 332 may include instructions to reduce the first rate of rotation by 100 rotations per minute, such that instructions 332 would reduce the rate of rotation of the recoater to 260 rotations per minute. Examples are not so limited, however, and any threshold amount of reduction in rate of rotation from the first rate of rotation may be used.

Instructions 334, when executed by processing resource 326, may include instructions to determine that the recoater has reached a second location of the build area. In some examples, the second location of the build area may be different than the first location of the build area. For example, the second location may be located a particular distance away from the first location of the build area.

In some examples, the second location of the build area may include a build-up of build material. For example, the second location can include a build-up of build material 222 as illustrated in FIGS. 2A-2C. As discussed previously, the build-up of build material may be located near a boundary of a build area. The build-up of build material may correspond to build material left over from a prior leveling process performed by the recoater. That is, the build-up of build material at the second location may be caused by a previous leveling process. As described previously with respect to FIG. 2A, because the recoater may serve to level build material on the build area to a uniform thickness, excess build material, that is, build material above the amount of build material needed for the uniform thickness, may continue to be pushed by the recoater. As a result, the excess build material may collect at an edge of the build area as a build-up of build material.

Instructions 336, when executed by a processing resource 326, include instructions to lift the recoater. In some examples, instructions 336 may include instructions to lift the recoater in response to the determination made at 334 that the recoater has reached the second location of the build area. Said differently, instructions 336 may include instructions to lift the recoater when it has reached the second location of the build area.

In some examples, instructions 336 may include instructions to lift the recoater over the build-up of build material. In such examples, instructions 336 may include instructions to lift the recoater a particular height. For example, the instructions 336 may include instructions to lift the recoater a height 224 as illustrated in FIG. 2B. In some examples, the particular height is a height that is greater than the height of the build-up of build material. Instructions 336 may include instructions to lift the recoater by translating the recoater in a direction perpendicular to the build area. Said differently, instructions 336 may include instructions to lift the recoater by translating it in a substantially vertical direction away from the build area. The recoater may be coupled to a lifting mechanism, such as a motor, that is able to translate the recoater about an axis that is substantially perpendicular to the build area.

In some examples, the recoater may be lifted by a carriage, such as carriage 216 shown in FIG. 2. The carriage may travel over the build area on a track, rail, or other system. In some examples, when the carriage reaches a particular location on the track system, a mechanical trigger may be activated. For instance, a peg may "catch" on an interior opening of the carriage connected to the recoater, causing the recoater to lift above the build area.

In some examples, the carriage may lift the recoater by pivoting the recoater about a pivot point. The pivot point may be located above the recoater. An axis of rotation may be defined through the pivot point. The recoater may rotate about the axis of rotation from a first position to a second position. In some examples, the first position may be a lowered position, or a position in which the recoater is in contact with the build area. The second position may be a lifted position, or a position in which the recoater is not in contact with the build area but rather is located a height above the build area. In some examples, the recoater may travel from the first position to the second position by rotating about the axis of rotation defined by the pivot point through an angle. The angle may be any angle between 0 and 90°.

Instructions 338, when executed by processing resource 326, may include instructions to move the recoater over the build-up of the build material at the second location. In some examples, the recoater may be moved over the build-up of build material while in the lifted position. As such, the recoater may avoid contacting the build-up of build material while moving over the second location. In some examples, the recoater may be moved partially over the build-up of build material. That is, the recoater may be moved over a portion of the build-up of build material that is less than the full build-up of build material.

In some examples, the recoater may be moved over the build-up of build material by the carriage. As described previously, the carriage may move across the build area via a track system or rail system. The track system or rail system may include track or rail positioned such that the carriage may move over the second location. In such examples, the carriage may travel along the track system or rail system over the second location, thus moving the recoater over the build-up of build material at the second location as well.

Memory resource 328 may further include instructions to lower the recoater. In some examples, the instructions to lower the recoater may include instructions to lower the recoater once the recoater has moved past the second location. That is, the instructions to lower the recoater may include instructions to lower the recoater once the recoater has cleared the build-up of build material. The instructions to lower the recoater may include instructions to lower the recoater by lowering the recoater in a direction perpendicular to the build surface. Said differently, the recoater may be lowered through a reversal of the lift of the recoater executed by the instructions 336.

Memory resource 328 may further include instructions to move the recoater at the lowered position in a second direction. In some examples, the second direction may be a direction opposite the first direction. For example, as shown in FIG. 2C, the recoater may move in a direction opposite the first direction upon being lowered after clearing the build-up of build material. Moving the recoater at the lowered position in a second direction may allow the recoater to level the build-up of build material. In some examples, the build-up of build material may be leveled by being moved by the recoater into the build area.

Memory resource 328 may further include instructions to rotate the recoater at a second rate of rotation. In some examples, the second rate of rotation may be different than the first rate of rotation. For example, the second rate of rotation may be less than first rate of rotation in anticipation of the recoater coming into contact with the build-up of build material. In addition, the recoater may rotate in an opposite direction at the second rate of rotation. That is, the recoater direction of rotation may be reversed at the second rate of rotation from the direction of rotation at the first rate of rotation. For example, the recoater may rotate in a clockwise direction at the first rate of rotation. The recoater may then rotate in a counterclockwise direction at the second rate of rotation. Examples are not so limited, however, and any direction of rotation may be reversed. As described with respect to FIG. 1, reversing the direction of rotation may assist in minimizing the amount of build material that is not reintegrated into the system.

Figure 4:
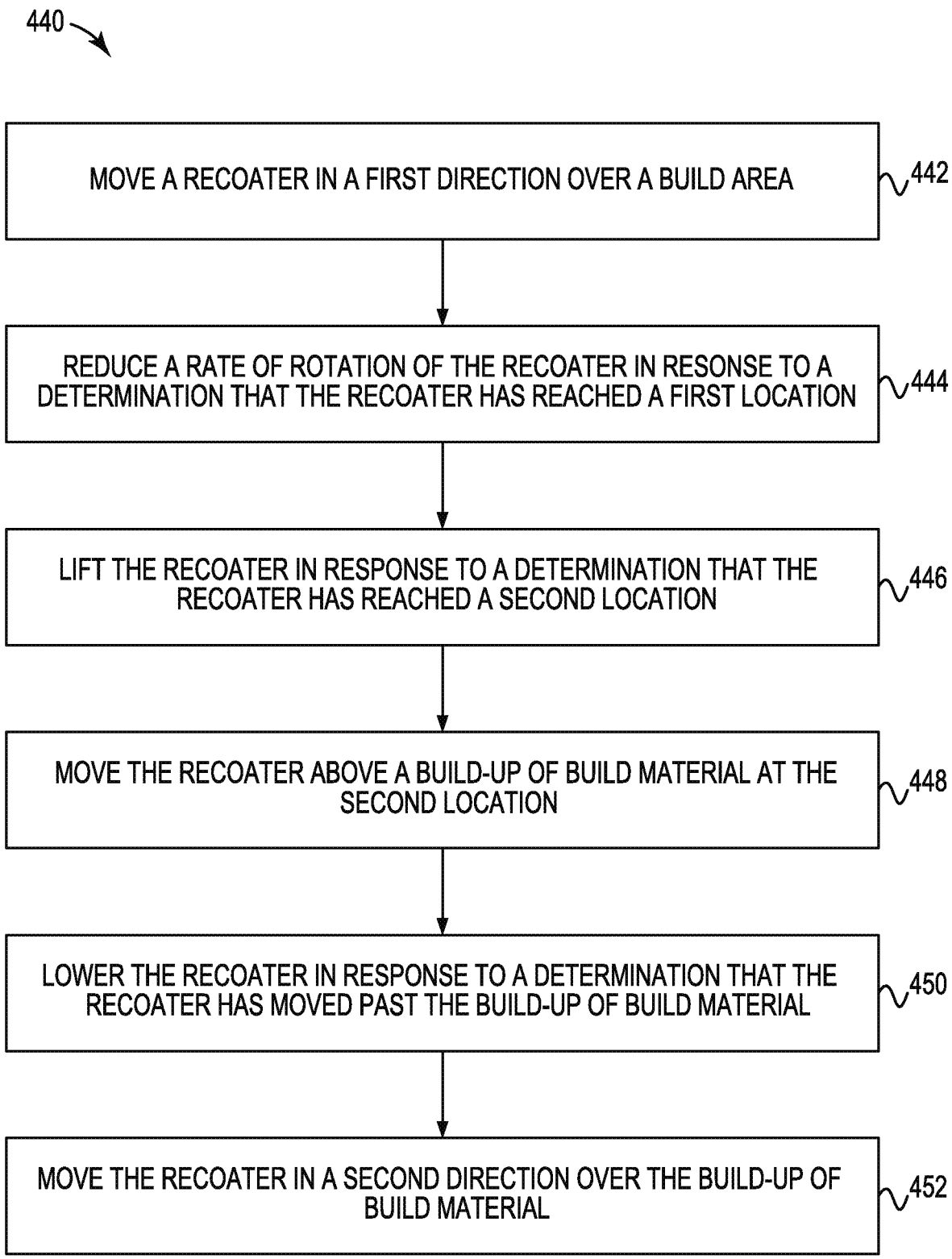
FIG. 4 is an example method for recoater movement according to the present disclosure.

FIG. 4 is a method 440 for recoater movement according to the present disclosure. In some examples, the method 440 may be performed by a computing device and/or a controller as described herein. For example, the method 440 may be performed by controller 320 as illustrated in FIG. 3.

At 442, method 440 may include moving a recoater in a first direction over a build area. In some examples, the build area may contain or include build material. In such examples, moving the recoater in a first direction over the build area may include leveling the build material on the build area. For example, moving the recoater in a first direction over the build area may spread the build material to a uniform thickness. The recoater may further move excess build material off the build surface.

At 444, method 440 may include reducing a rate of rotation of the recoater. In some examples, the rate of rotation of the recoater may be reduced in response to a determination that the recoater has reached a first location of the build area. As described previously, the first location of the build area may be a location of the build area that is a particular distance from an approaching second location. The rate of rotation may be reduced from a first rate of rotation to a second rate of rotation. The second rate of rotation may be less than the first rate of rotation. Reducing the rate of rotation may reduce an amount of compaction of the build material on the build area. That is, a reduced rated of rotation may result in build material being less compacted. Moreover, reducing the rate of rotation may reduce a number of ripples or flaws on the build area.

At 446, method 440 may include lifting the recoater in response to a determination that the recoater has reached a second location of the build area. In some examples, the recoater may be lifted by rotating the recoater about a pivot point above the recoater. As discussed previously with respect to FIG. 1, rotating the recoater about a pivot point above the recoater may include rotating the recoater about an axis of rotation from a first position to a second position, where the axis of rotation is defined through the pivot point. In some examples, lifting the recoater at 446 may include determining a distance to lift the recoater. The distance to lift the recoater may be determined based on a height of a build-up of build material at the second location. The recoater may then be lifted the determined height. In some examples, the determined height may be greater than the height of the build-up of build material, such that the recoater will be lifted a height to allow the recoater to pass the build-up of build material.

At 448, method 440 may include moving the recoater above the build-up of build material at the second location. The recoater may be moved above the build-up of build material at the lifted positon. As described previously, moving the recoater above the build-up of build material at the second location may include moving the recoater over the second location without making contact with the build-up of build material.

At 450, method 440 may include lowering the recoater. In some examples, the recoater may be lowered at 450 in response to a determination that the recoater has moved past the build-up of build material at the second location. As described previously with respect to FIG. 1, lowering the recoater at 450 may include rotating the recoater about the pivot point in a direction opposite the direction of lift. In some examples, the recoater may be positioned at an index position upon being lowered. As used herein, an index position refers to a reference point on the recoater. The index position may be used as a point of reference to ensure that the recoater is at a particular height, or may be used to track the movement of the recoater. In some examples, positioning the recoater at an index position may include positioning the recoater such that a reference point on the recoater is positioned at a location proximate to the build area. Positioning the recoater at an index position may help ensure that the recoater is in a correct position to begin a subsequent pass over the build area. Positioning the recoater at an index position may further help ensure that a particular portion of the recoater contacts a particular portion of the build area as the recoater moves over the build area. In addition, positioning the recoater at an index position may help minimize recoater to powder interactions by randomizing the portion of the recoater that contacts a particular location on the build area.

At 452, method 440 may include moving the recoater in a second direction. In some examples, moving the recoater in a second direction at 452 may include moving the recoater over the build-up of build material and over the build area. The recoater may move the build-up of build material back over the build area, where it may then level the build material. In some examples, moving the recoater in a second direction at 452 may include moving the recoater in a direction opposite the first direction. For example, the recoater may move in a first direction and be moving left to right. At 452, the recoater may move in the second direction and be moving right to left. Changing the direction in which the recoater is moved may allow the recoater to continue to engage with the build area with repeated passes, as opposed to having to reset each time a pass is completed by returning to a starting position.

Method 440 may further include rotating the recoater in a first rotation direction when the recoater is moving in the first direction. In some examples, the first rotation direction may correspond to the first direction of movement. That is, the first rotation direction may be the direction of rotation usable by the first direction of movement for spreading and leveling the build material. For example, the recoater may move in a first direction from left to right and may thus rotate in a counterclockwise direction. Method 440 may further include rotating the recoater in a second rotation direction when the roller is moving in the second direction. In some examples, the second rotation direction and/or the second direction may be opposite the first rotation direction and/or the first direction. For example, the recoater may move in a second direction from right to left and rotate in a clockwise direction. As described previously, having a first direction of travel correspond to a first direction of rotation and a second direction of travel correspond to second direction of travel may help ensure that a maximum amount of build-up of build material is able to be reintegrated into the system through minimization of the amount of build material pushed away from the build area by opposing directional forces caused by a mismatch in direction of travel and direction of rotation.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A non-transitory machine readable medium containing instructions executable by a processor to cause the processor to:
   determine that, while moving along a first direction, a recoater has reached a first location of a build surface of a build area, a three-dimensional (3D) object being created at the build surface, the first location comprising build material;
   in response to determining that the recoater has reached the first location, change an action of the recoater;
   determine that, while continuing to move along the first direction, the recoater has reached a build-up of the build material at a second location of the build surface different than the first location;
   in response to determining that the recoater has reached the build-up of the build material, lift the recoater above the build-up such that the recoater is not in contact with the build-up; and
   while the recoater is lifted and while the recoater is not in contact with the build-up, continue to move the recoater in the first direction over the build-up of the build material and without coming into contact with the build-up.

2. The non-transitory machine readable medium of claim 1, further including instructions to change a direction of rotation of the recoater to an opposite direction of rotation subsequent to the recoater moving over the build-up of the build material.

3. The non-transitory machine readable medium of claim 1, wherein the instructions to change an action of a recoater includes instructions to:
   reduce a rate of rotation of the recoater; and
   reduce a travel speed of the recoater.

4. The non-transitory machine readable medium of claim 1, further comprising instructions to:
   lower the recoater by rotating the recoater about a pivot point above the recoater; and
   after the recoater has been lowered, move the recoater in a second direction opposite the first direction to pass the recoater back towards the build-up, the recoater making contact with and leveling the build-up as the recoater moves in the second direction, to immediately reintegrate the build-up back into the build surface at which the 3D object is being created.

5. A system comprising:
   a controller to:
      move a recoater coupled to a carriage device over a build surface of a build area in a first direction, a three-dimensional (3D) object being created at the build surface;
      determine that, while moving in the first direction, the recoater has reached a first location of the build surface at which the 3D object is being created, the first location comprising build material;
      in response to determining that the recoater has reached the first location, reduce a first rate of rotation; and
      determine that, while continuing to move in the first direction, the recoater has reached a build-up of the build material at a second location of the build surface different than the first location; and
   the carriage device to:
      in response to determining that the recoater has reached the build-up of the build material, lift the recoater above the build-up of the build material such that the recoater is not in contact with the build-up of the build material; and
      while the recoater is lifted and while the recoater is not in contact with the build-up of the build material, continue to move the recoater over the build-up of the build material and without coming into contact with the build-up.

6. The system of claim 5, wherein the carriage device lifts the recoater by translating the recoater in a direction perpendicular to the build area.

7. The system of claim 5, wherein the carriage device lifts the recoater rotating the recoater about a pivot point above the recoater.

8. The system of claim 5, wherein the controller causes the carriage to lower the recoater when the recoater has moved over the build-up of the build material.

9. The system of claim 8, wherein the controller causes the recoater to, after the recoater has been lowered, move in a second direction that is opposite the first direction to pass back towards the build-up, the recoater making contacting with and leveling the build-up of build material as the recoater moves in the second direction, to immediately reintegrate the build-up back into the build surface at which the 3D object is being created.

10. The system of claim 5, wherein:

the controller is to rotate the recoater at a second rate of rotation that is different than the first rate of rotation; and the recoater, at the second rate of rotation, rotates in a direction that is opposite to a direction at which the recoater rotated prior to moving over the build-up of the build material.

11. A method comprising:

moving a recoater in a first direction over a build surface of a build area to level build material on the build surface, a three-dimensional (3D) object being created at the build surface;

determining that, while moving along the first direction, the recoater has reached a first location of the build surface, the first location comprising build material;

in response to determining that the recoater has reached the first location, reducing a rate of rotation of the recoater;

determining that, while continuing to move along the first direction, the recoater has reached a build-up of the build material at a second location of the build surface different than the first location;

in response to determining that the recoater has reached the build-up of the build material, lifting the recoater above the build-up such that the recoater is not in contact with the build-up;

while the recoater is lifted and while the recoater is not in contact with the build-up, continuing to move the recoater in the first direction over the build-up of the build material and without coming into contact with the build-up;

determining that the recoater has moved over the build-up;

in response to determining that the recoater has moved over the build-up, lowering the recoater; and after the recoater has been lowered, moving the recoater in a second direction opposite the first direction to pass the recoater back towards the build-up, the recoater making contact with and leveling the build-up as the recoater moves in the second direction, to immediately reintegrate the build-up back into the build surface at which the 3D object is being created.

12. The method of claim 11, wherein lifting the recoater above the build-up includes:

determining a distance to lift the recoater, wherein the distance to lift the recoater corresponds to a height of the build-up of the build material at the second location; and lifting the recoater the determined distance.

13. The method of claim 11, further comprising positioning the recoater at an index position such that a reference point on the recoater is positioned at a location proximate to the build area.

14. The method of claim 11, further comprising:

rotating the recoater in a first rotation direction when the recoater is moving in the first direction; and rotating the recoater in a second rotation direction that is opposite the first rotation direction when the recoater is moving in the second direction.

* * * * *